United States Patent [19]

Simko

[11] 3,776,207

[45] Dec. 4, 1973

[54] ENGINE CONSTANT RATE EXHAUST GAS RECIRCULATION SYSTEM

[75] Inventor: Aladar O. Simko, Dearborn Heights, Mich.

[73] Assignee: Ford Motor Company, Dearborn, Mich.

[22] Filed: Nov. 3, 1972

[21] Appl. No.: 303,660

[52] U.S. Cl. .............................. 123/119 A, 60/278
[51] Int. Cl. ........................................... F02m 25/00
[58] Field of Search .................. 123/119 A; 60/278, 60/279

[56] References Cited
UNITED STATES PATENTS
3,542,004  11/1970  Cornelius ...................... 123/119 A FOREIGN PATENTS OR APPLICATIONS
859,237  12/1952  Germany ...................... 123/119 A Primary Examiner—Wendell E. Burns
Attorney—Keith L. Zerschling et al.

[57] ABSTRACT

An engine has a portion of the exhaust manifolding connected at times to the intake system for directing at times a predetermined percentage of the exhaust gases into the engine, while the remainder of the manifolding is connected to a conventional exhaust system, to maintain a constant exhaust gas recirculation rate at times, a diverter valve operable at engine wide open throttle conditions to discharge all of the exhaust gases to the exhaust system, for greater power.

10 Claims, 1 Drawing Figure

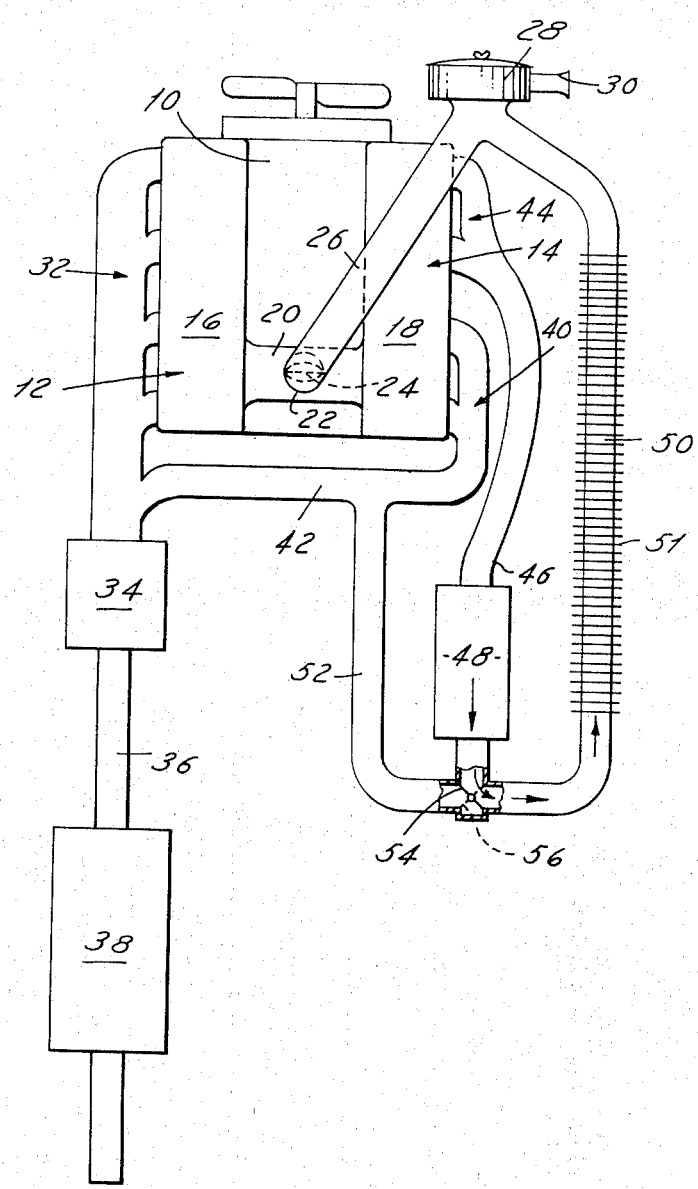

ENGINE CONSTANT RATE EXHAUST GAS RECIRCULATION SYSTEM

This invention relates, in general, to an internal combustion engine, and more particularly to one in which a constant rate of exhaust gas is recirculated back into the engine during at least portions of the complete engine operating cycle.

It is known that the output of oxides of nitrogen increases as engine combustion peak temperatures and pressures increase. It is also known that the peak temperatures can be reduced by the recirculation of exhaust gases back into the engine.

It has been found that very low $NO_x$ levels with acceptable operation can be achieved when a constant exhaust gas recirculation rate, such as 25 percent, for example, is maintained throughout the entire part load range operation, including idle. This of course requires close control of the EGR rate for long mileages because reduced EGR rates would result in increased peak combustion temperatures whereas increased EGR rate would lead to misfiring.

The invention provides the desired control of exhaust gas recirculation and eliminates the above objections by assuring a constant rate of engine exhaust gas recirculation thoughout the life of the vehicle.

More specifically, the invention directs all of the exhaust gases from a selected number of the engine cylinders less than all to the air intake system of the engine for reburning in the engine proper, while the exhaust gases from the remaining number of cylinders is directed in a conventional manner to the exhaust system of the vehicle. A constant percentage of exhaust gas concentration will, therefore, be maintained throughout the load cycle of the engine, thereby eliminating the need for complicated control devices and other apparatus.

It is a primary object of the invention, therefore, to provide an engine exhaust gas recirculating system that is reliable by being simple in construction and operation and without need for adjustment to maintain it in proper working order.

It is a further object of the invention to provide an engine exhaust gas recirculating system that maintains a constant percentage of the exhaust gases recirculated to the engine at all times during part load and idle speed operation.

It is a still further object of the invention to provide an exhaust gas recirculating system in which all of the exhaust gases from two of the cylinders of an eight cylinder engine are directed to the engine air intake system before being burned in the engine, the exhaust gases from the remaining six cylinders being conveyed directly to the conventional engine exhaust system; the system, therefore, assuring a constant 25 percent exhaust gas recirculation rate under all environmental conditions.

Another object of the invention is to provide an exhaust gas recirculating system of the type described above in which a diverter valve is included and operable in response to wide open throttle conditions to block the flow of exhaust gas into the engine air intake system while simultaneously directing all of the engine exhaust gases into the conventional exhaust system.

Other objects, features and advantages of the invention will become more apparent upon reference to the succeeding detailed description thereof, and to the drawing illustrating the preferred embodiment thereof; wherein, the single FIGURE schematically represents a plan view of an internal combustion engine embodying the invention, with parts broken away and in section.

The FIGURE illustrates schematically the engine block 10 of an eight cylinder engine having right and left banks of cylinders 12 and 14. The engine has intake manifolds indicated schematically at 16 and 18 which are supplied with air or an air/fuel mixture by an interconnection 20.

In this particular instance, no carburetor is shown over the intake manifold riser as the engine is constructed for the direct injection of fuel into each cylinder. The induction manifolding, therefore, in this case, includes an air intake opening 22 that is controlled by an air throttle valve 24 connected by suitable linkage, not shown, for rotation by the vehicle operator. The details of construction and operation are not shown since they are known and believed to be unnecessary for an understanding of the invention. Refer for example, to U.S. Ser. No. 876,717, Bishop et al, Combustion Process for Engine of Spark Ignition, Fuel Injection Type, assigned to the assignee of this application.

The air inlet opening 22 is connected by a suitable duct 26 to a remotely located conventional air cleaner assembly 28. The latter may be of any suitable type, and is illustrated in this instance as being of the dry element type having a snorkel type air inlet 30 and an annular paper filter type element, not shown, within the assembly.

Returning to the engine per se, the left bank of cylinders 12 has connected to its exhaust ports, not shown, an exhaust manifolding 32 connecting all four exhaust ports to a conventional exhaust system. The latter in this case includes a catalytic converter indicated at 34 located in the exhaust pipe 36, and a muffler 38 adjacent the end of the exhaust pipe for silencing the exhaust prior to discharge into the atmosphere.

The exhaust manifolding for the right bank of cylinders 14 in this case has the two rearmost exhaust ports connected by a short exhaust manifold 40 ducted by a line 42 to the exhaust pipe 36. The remaining two front cylinders are exhausted through an additional two port exhaust manifold portion 44 connected by suitable piping 46 and a muffler 48 to an exhaust recirculation pipe 50. The latter terminates at the connection of the fresh air intake to the air cleaner 28 preferably on the clean side of the filter within the assembly.

The tube 50 has cooling fins 51 attached to it to cool the recirculated gas in the manner of a heat exchanger prior to its mixture with the air intake system so as not to overly vaporize the fuel in the engine cylinders. Also, the exhaust recirculation pipe 50 is chosen to be of a length such that the engine pulsations in manifold portion 42 are damped by the time the exhaust gases reach the intake at the air cleaner assembly, which is entering the engine at a fairly constant rate.

A branch 52 of the pipe 42 leading from rear manifold portion 40 is connected to exhaust recirculation pipe 50, as shown. At the juncture, a rotatable throttle-like diverter valve 54 is provided to control the passage of the exhaust gases from the number 1 and 2 cylinders connected to manifold 44 either to the air intake system via pipe 50 or into the exhaust system via pipe branch 52. Valve 54 normally would be in the position shown. Suitable linkage, not shown, can be provided between the diverter valve and the air throttle valve so that the diverter valve remains in the position shown for all part load operation of the engine including idle speed operation, and is rotated 90° to the dotted line position 56 when the air throttle valve is moved to a wide open position.

In operation, for all engine operations at part load and idle speed, the diverter valve will be in the solid line position shown. Accordingly, all of the exhaust gases from the number 1 and 2 cylinders will be directed into manifold portion 44 and therefrom through the muffler 48 and pipe 50 to mix with the air in the intake system tube 26. All of the exhaust gases from the remaining six cylinders will be exhausted through manifold portions 40 and 32 and to the exhaust pipe 36 as shown. Accordingly, it will be seen that a constant 25 percent of the exhaust gases will be recirculated back into the engine intake system at all times so long as diverter valve 54 is in the position shown.

When the engine is operated at wide open throttle conditions, maximum power output is obtained by the intake of the maximum amount of air possible. Accordingly, exhaust gas recirculation at this time is not desirable. Therefore, when the air throttle valve is rotated to its wide open position, the diverter valve 54 likewise is rotated to position 56 to thus flow all of the exhaust gases from all the cylinders into the exhaust system, and none to the air intake system.

While the invention has been described and illustrated in its preferred embodiment, it will be clear to those skilled in the arts to which it pertains that many changes and modifications may be made, without departing from the scope of the invention. For example, on four cylinder engines, a similar system can be arranged by recirculating exhaust gas from one cylinder. In the case of a six cylinder engine, one cylinder represents 16.7 percent exhaust gas, which would not be as good for very low $NO_x$ level objectives, but it would provide a constant rate recirculation lowering the $NO_x$ level. Similarly on eight cylinder engines, the exhaust gas of only one cylinder, representing 12.5 percent, can be recirculated for moderate $NO_x$ control. Thus, this exhaust recirculation concept can be readily utilized with all manifold or direct injection engines.

I claim:

1. An exhaust gas recirculating system for an internal combustion engine having a plurality of cylinders and an air intake to the engine, comprising, means for recirculating all of the exhaust gases from a selected number less than all of the cylinders to the air intake and none from the remaining number of cylinders to maintain a constant rate of exhaust gas recirculation throughout at least part of the load range of operation of the engine.

2. A method of controlling the output of pollutants from an internal combustion engine comprising the step of directing the entire discharge of exhaust gases from a number of engine cylinders less than all to the engine intake system for mixing with the air therein for recirculation back into the engine, and directing the exhaust gases from the remaining number of cylinders to the engine exhaust system.

3. A method as in claim 2, including the step of diverting at engine wide open throttle range of operation the entire discharge from the selected number of cylinders away from the air intake and into the exhaust system along with the exhaust gases from the remaining number of cylinders, to increase the maximum power output of the engine.

4. A method as in claim 2, including the step of directing the exhaust gases from the selected number of cylinders into the air intake system during the entire part load period of operation of the engine including idle speed operation.

5. A method as in claim 2, including directing all of the exhaust gases from two of the cylinders of an eight cylinder engine or one of the cylinders of a four cylinder engine to the engine intake system to maintain the recirculation thereto of a constant 25 percent of the engine exhaust gases to the intake system.

6. A system as in claim 1, including first exhaust manifolding connecting the exhaust gases from the selected number of cylinders to the engine intake system, and second manifolding connecting the exhaust gases from the remaining number of cylinders to the exhaust system.

7. A system as in claim 6, the air intake system including an engine air cleaner assembly having a fresh air inlet and a filter therein, and conduit means to connect the first manifolding to the clean air side of the filter.

8. A system as in claim 6, including conduit means connecting the first and second manifolding, and diverter valve means in the conduit means normally closed to prevent communication between the manifolding, but operable in response to predetermined engine operation to bypass the exhaust gases from the first manifolding into the second manifolding.

9. A system as in claim 6, including heat exhanger means for cooling the exhaust gases in the first manifolding.

10. A system as in claim 6, the connection between the first manifolding and the air intake system being so constructed and arranged of a length to dampen out pressure pulsations of the gases discharged from the first manifolding prior to mixture with the essentially constantly flowing air.

* * * * *